ent Patent [19] [11] 4,092,579
Weit [45] May 30, 1978

[54] BRUSHLESS PRINTED CIRCUIT RESOLVER

[75] Inventor: James G. Weit, Pittsburgh, Pa.

[73] Assignee: Contraves Goerz Corporation, Pittsburgh, Pa.

[21] Appl. No.: 750,907

[22] Filed: Dec. 15, 1976

[51] Int. Cl.² .................................................. G08C 19/16
[52] U.S. Cl. .................................. 318/662; 324/61 R; 340/200; 361/287
[58] Field of Search ................ 318/662; 361/287, 289; 340/200; 324/61 R

[56] References Cited

U.S. PATENT DOCUMENTS

| 3,312,892 | 4/1967 | Parnes | 340/200 X |
| 3,845,377 | 10/1974 | Shimotori | 318/662 |
| 3,961,318 | 6/1976 | Farrand et al. | 324/61 R |

*Primary Examiner*—B. Dobeck
*Attorney, Agent, or Firm*—Robert D. Yeager; Howard G. Massung

[57] ABSTRACT

A brushless printed circuit resolver for converting a shaft angular position to a voltage signal, defined by the envelope of a carrier, which indicates the mechanical angle. The brushless resolver includes a stationary member having two conducting foils formed thereon which are capactively coupled to associated foils on a movable member. The capacitive coupling between these input foils remains constant as the movable member is moved. A pair of output foils are also disposed on a movable member and each is electrically connected to one of the movable input foils. A pair of shaped stationary output foils are mounted with a small separation from the movable output foils so that the capacitive coupling between the movable and stationary output foils varies as a determinable function. To get the desired output it is necessary that the movable output foils and the stationary output foils be relatively shaped so that capacitive coupling between the movable and the stationary output foils vary as the desired function. There can be two pairs of movable output foils, disposed in a quadrature relationship, which provides an output signal giving an unambiguous indication of shaft position. By having the rotor output foils properly configured, a resolver having any number of poles can be produced. The output signal defined by the envelope of the carrier can be a two phase, quadrature displaced signal such as sine and cosine indications, three phase 120° displaced signals as for a synchro, or if desired other number of phases can also be provided. By proper formation of the foil pattern configuration, the output signal as a function of the rotary angle can be made to be a variety of shapes. Sinusoidal output envelopes will normally be provided for standard resolver-synchro circuits. Triangular output envelopes which have special advantages for some position applications can also be provided.

13 Claims, 9 Drawing Figures

BRUSHLESS PRINTED CIRCUIT RESOLVER

BACKGROUND OF THE INVENTION

1. Field of the Invention

This invention relates to resolvers and synchros and more particularly to a brushless printed circuit resolver operating by capacitive coupling.

2. Description of the Prior Art

Various prior art patents utilize capacitive coupling for providing an indication of the rotor angle. However, most of these patents require either a physical electrical connection to the rotor, or use an insulating or conducting member disposed between two stationary members, which as it rotates changes the capacitive coupling between the stationary members. Exemplary of prior art patents are:

U.S. Pat. No. 2,534,505 issued Dec. 19, 1950 to W. K. Ergen which teaches a dielectric vane rotated between a plate and segments of a plate to vary capacitance therebetween. The Ergen patent requires a rather complicated bridge for an indication pickup.

U.S. Pat. No. 2,614,171 issued Oct. 14, 1952 to L. Fein teaches an electrical apparatus for measuring angles which requires an electrical connection to the rotor for operation. The device disclosed in Fein is effected in operation by the distributed resistance of the elements being used.

U.S. Pat. No. 2,674,729 issued Apr. 6, 1954 to E. P. Carter teaches a measuring apparatus requiring slip ring connections to the rotary member. The stator and rotor are each of the same type of construction.

U.S. Pat. No. 3,198,937 issued Aug. 3, 1965 to A. M. Wooster teaches a digital position-indicating unit. The unit disclosed therein provides a pulsetrain output.

U.S. Pat. No. 3,221,256 issued Nov. 30, 1965 to R. L. Walden teaches an electrostatic position transducer. The device disclosed therein is a single phase device requiring an electrical connection to the movable member. Walden does not teach a device providing a quadrature or polyphase output.

U.S. Pat. No. 3,517,282 issued June 23, 1970 to A. Miller teaches a variable capacitance transducer which utilizes a dielectric plate rotatable between spaced apart capacitor plates for providing position information. The device disclosed does not provide a quadrature output.

U.S. Pat. No. 3,668,672 issued June 6, 1972 to J. A. Parnell teaches a capacitive transducer utilizing shielding plate disposed between two capacitive coupled outer plates. The shielding plate is movable and has an electrical connection through a slip ring made thereto. The Parnell device provides only a single phase output.

U.S. Pat. No. 3,732,553 issued May 8, 1973 to E. V. Hardway, Jr. discloses a capacitive pick-off transducer using a movable shield plate disposed between capacitive plates to vary capacitance. A connection is required to the movable shield plate to maintain it at a ground potential level. Hardway does not teach a quadrature related output.

U.S. Pat. No. 3,845,377 issued Oct. 29, 1974 to A. Shimotori teaches a rotational angle transducer for producing a pulse output. A rotatable shield disposed between capacitively coupled members is utilized for developing the desired output.

U.S. Pat. No. 3,961,318 to R. W. Farrand teaches an Electrostatic Position Measuring Transducer in which two spaced relatively movable elements have electrostatically coupled sets of uniformly spaced interdigitated finger electrodes to form a precision, high gain linear or angular position measuring transducer. Each element has two base portions with a plurality of finger portions extending therefrom. The finger portions on each element are uniformly spaced one measurement cycle apart, with the fingers of one base portion interdigitated at one half cycle spacing with the fingers of the other base portion. No direct electrical connections are made to the movable elements which is connected to the instrumented member. The fingers on the movable and stationary member are of the same general shape, with the stationary fingers being slightly smaller radially. The teaching of this patent seems mainly to be directed to a resolver having a rather large number of poles.

A problem with prior art capactively coupled resolvers is that they have difficulty in providing a good output position signal with little undesirable harmonics.

Prior art capacitively coupled resolvers are generally operable with a relatively large number of cycles per revolution and it is difficult to obtain a good output from a device having a small number of cycles per revolution.

SUMMARY OF THE INVENTION

A printed circuit brushless resolver having a small number of poles and cycles per revolution, utilizing capacitive coupling and providing an output signal having little unwanted harmonic distortion. The disclosed resolver provides a multi-phase output such as provided by a standard resolver. No special circuits are required for operation and standard carrier techniques as developed for prior art resolvers and synchros can be used.

Two stationary input foil areas are provided for receiving a carrier signal from an oscillator connected therebetween. These input foil areas are coupled to associated movable input foil areas by relatively constant capacitive coupling. The pair of stationary input foils and the pair of movable input foils can be of the same shape and separated by a small air gap. Each movable input foil has an output foil area electrically connected thereto and mechanically movable therewith. The movable output foils are capacitively coupled to shaped stationary output foils. The movable foils are supported on a movable member which is mechanically connected to the shaft to be instrumented. The capacitive coupling between the movable output foils and the stationary output foils varies as the movable foils are moved so that an output signal picked off from the stationary output foils has an envelope which defines the relative position of the movable member. Unlike any prior art resolvers the stationary and movable output foils relatively are shaped so that the capacitive coupling therebetween varies as the desired output function. The stationary output foils can be two pairs of foils which are in a quadrature relationship radially spaced but circumferentially coextensive so that an unambiguous position indication is provided.

In a common embodiment of the device, the stationary pair of input foils and the rotary pair of input foils are formed as concentric foil areas of the same relative area. The foils are concentric about the axes of the shaft to be instrumented to which the movable member containing the rotary input foils is connected. The rotary input foils are formed on an insulating movable member which is physically connected to the shaft to be instrumented, for unitary movement therewith. The rotary input foils are separated by a small air gap from their stationary counterparts and the capacitive coupling therebetween remains constant as the shaft to be instrumented is rotated. Rotary output foils are also disposed on the rotating insulating member and are electrically connected to associated rotary input foils. The rotary output foils can be formed as extensions of the associated rotary input foils or formed separate therefrom but electrically connected thereto. The configuration of the rotary output foils determines the number of poles which a device will have. Stationary output foils are provided which have specially sinusoidal shaped foil areas for picking up signals from the rotary output foils, positioned so that the magnitude of the carrier signal envelope is a sine and cosine function of the rotor angular position. Amplifiers can be connected to increase the signal strength of the output signals. For example, for a two pole device the first pair of foils can be sine shaped and disposed to provide a sine relationship, so the output provided by the amplifier connected thereto is the sine of the angular displacement. The output is the sine of the angular position as defined by the envelope of the carrier. A second pair of sine shaped foils disposed in quadrature with the first pair of output foils can be provided for a cosine output. The amplifier connected to the second pair of stationary output foils then provides a signal whose carrier defines the cosine of the shaft angular position.

The foil areas are provided on printed circuit boards. Foils can be manufactured using standard printed circuit board techniques. High levels of printing circuit accuracy can be achieved easily using standard printed circuit board techniques. Two, three or more phase outputs are easily obtainable using the teaching of the present invention. Standard carrier techniques as developed for resolvers can be used and no special bridge type circuits are required for obtaining the desired signal. By varying the foil shapes, the output signal envelope as a function of the angular displacement can be made a variety of shapes. For example, the capacitive coupling can be made to vary as a triangular wave function when triangular position indications are desired. Using the printed circuit board techniques, the desired foil shapes are easily formed.

When the term resolver is used herein in the specification or claims it is used in a generic sense and is meant to include resolver, synchro, differential transformer, or any other sinusoidal position indicating device.

It is an object of the present invention to teach a brushless resolver having one movable member which is capacitively coupled to a stationary member for providing a single cycle high quality output.

It is another object of this invention to teach a simple three piece inexpensive resolver having a movable member capacitively coupled to two stationary members one of which has foils formed according to a selected function for providing a position output which can vary as the selected function.

BRIEF DESCRIPTION OF THE DRAWINGS

For a better understanding of the invention, reference may be had to the preferred embodiments exemplary of the invention, shown in the accompanying drawings in which.

DESCRIPTION OF THE PREFERRED EMBODIMENTS

Figure 1:
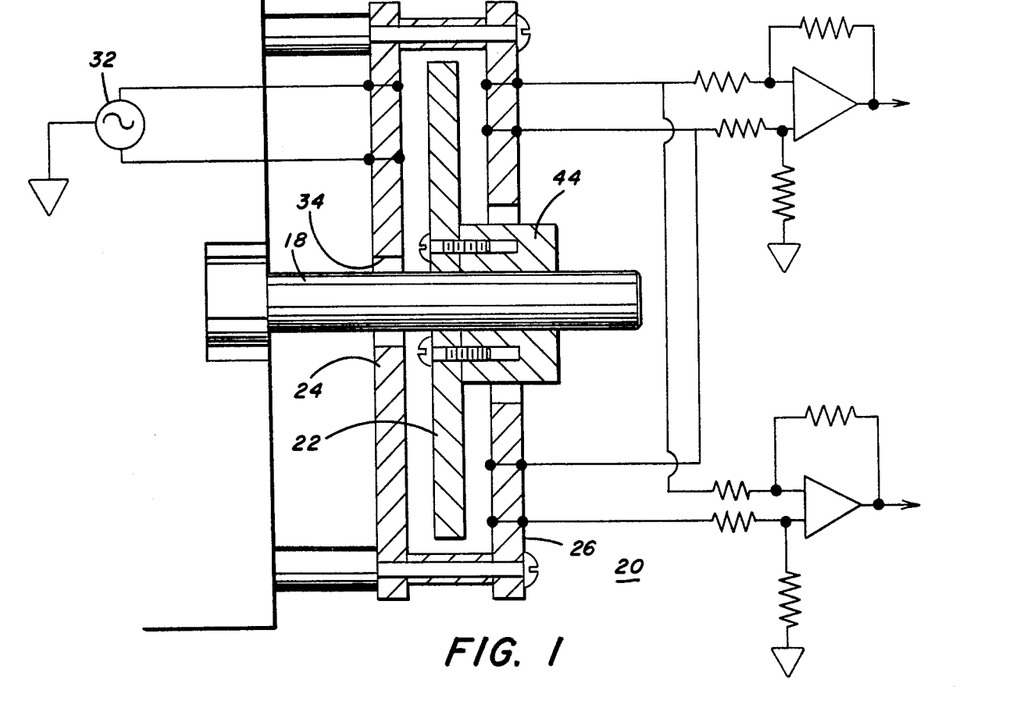
FIG. 1 is a side section view, partially in schematic, of a one cycle resolver utilizing the teaching of the present invention.
Figure 2:
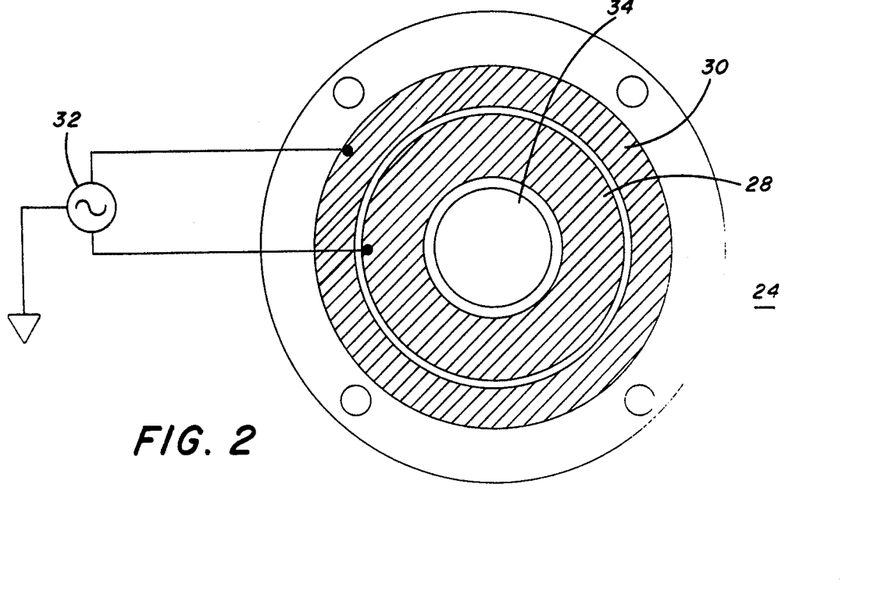
FIG. 2 is a view of a portion of the resolver shown in FIG. 1 showing the input stationary member having the input foils disposed thereon.

Referring now to the drawings and FIGS. 1 through 5 in particular there is shown a one cycle brushless resolver 20 constructed according to the teaching of the present invention. The one cycle resolver 20 provides one complete output cycle for each revolution of the instrumented shaft 18. In this embodiment of the invention a rotating member 22 is disposed between two stationary members 24 and 26. Input member 24 and output member 26 are relatively fixed. The input stator, as shown in FIG. 2, has two concentric foils 28 and 30 formed thereon. Stationary input member 24 is formed from an insulating material. An input carrier signal is applied across the foils 28 and 30. Oscillator 32 provides the input carrier signal. The frequency of oscillator 32 is high with respect to the speed of movement of shaft 18. Resolver 20 is connected to shaft 18 whose angular position is to be instrumented. Stationary input member 24 has a clearance hole 34 formed therethrough for clearance of rotatable shaft 18. Stationary input member 24 is disposed with foils 28 and 30 facing towards rotary member 22.

Figures 3, 4, 5:
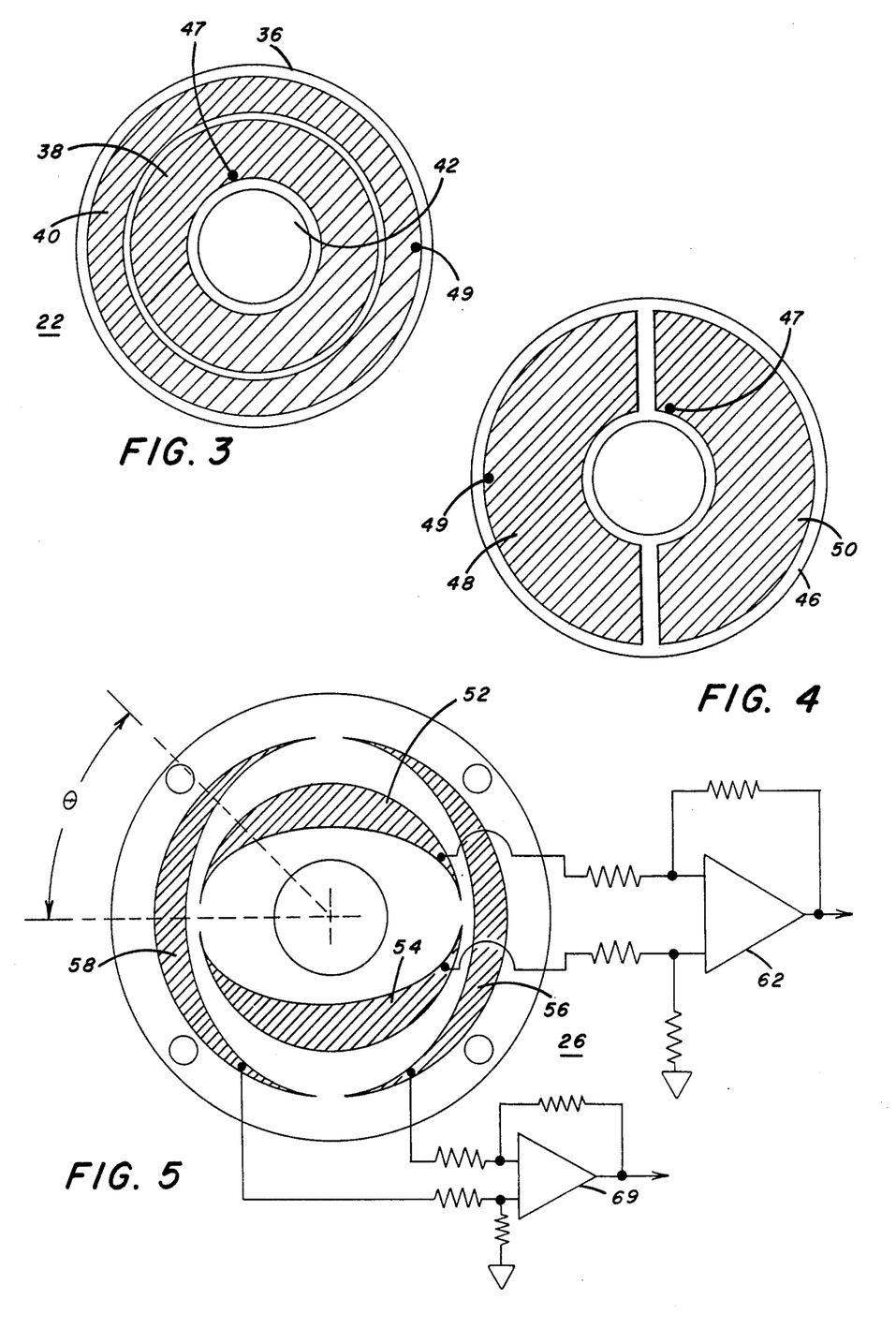
FIG. 3 is a view of the rotary member for the resolver of FIG. 1 showing the movable input foils formed thereon, which are capacitively coupled to the foils shown in FIG. 2.
FIG. 4 is a view of the other side of the rotary member shown in FIG. 3 illustrating the movable output foils formed thereon.
FIG. 5 is a view of the output stationary member showing the radially separated but circumferentially coextensive stationary output foils which are capacitively coupled to the foils shown in FIG. 4.

The side of rotary member 22 facing stationary member 24 is shown in FIG. 3. Rotary member 22 is formed of an insulating material and has side 36 facing stationary member 24, on which are formed concentric conducting foils 38 and 40. Foils 38 and 40 on side 36 are of the same relative size as foils 28 and 30 on member 24. Foils 38 and 40 face foils 28 and 30. Foils 38 and 40 are capacitively coupled to foils 28 and 30, respectively. The capacitive coupling between foils 28, 38 and 30, 40 does not vary as rotatable member 22 is rotated, but remains relatively constant. Rotatable member 22 has a center opening 42 formed therein which can be fit around shaft 18. Rotatable member 22 is connected to shaft 18 by suitable means such as bolting to a hub 44 attached to shaft 18.

FIG. 4 shows the back side 46 of rotatable member 22, whose input side is shown in FIG. 3. The side 46 of rotatable member 22 has two semi-circular conducting foils 48 and 50 printed thereon. Foil 50 is electrically connected to foil 38 and foil 48 is electrically connected to foil 40. These foils 50 and 38 and 48 and 40 can be connected by pins 47 and 49 respectively passing through circuit board 22. Alternately a plated hole can be formed in place of pins 47, 49 for making the appropriate electrical connections. Foils 38, 40, 48 and 50 are all relatively fixed. Foils 38 and 40 shield foils 48 and 50 from capacitive coupling with foils 28 and 30 to prevent undesirable harmonics from being present on the carrier signal between foils 48 and 50.

Facing side 46 of rotatable member 22 is stationary output member 26 as shown in FIG. 5. The foils as shown in FIGS. 4 and 5 are disposed with a zero reference at the vertical axis. Stationary member 26 has two pair of foils, 52, 54 and 56, 58 respectively formed thereon. Foils 52, 54, 56 and 58 are capacitively coupled to foils 48 and 50. Foils 52, 54, 56 and 58 are shaped according to a sine function so that the capacitive coupling between these foils and foils 48 and 50 vary as sine function. When positioned as a indicated, output foil pair 52, 54 provides the sine indication while output foil pair 56, 58 provides the cosine indication. As rotatable member 22 rotates the capacitive coupling between foils 48 and 50 and foils 52 through 58 varies. This variation is due to the relative angular displacement of rotatable member 22 with respect to stationary member 26. Foils 52, 54 are disposed in a quadrature relationship with foils 56, 58 so that an unambiguous position indication is obtained. The envelope of the output carrier signal thus defines the sine of the displaced angle for foils 52, 54 and the cosine of the displaced angle for foils 56, 58. That is, if the displaced angle is $\theta$ and the carrier signal is a function of $\cos \omega t$ the output from foils 52, 54 will be a function of $\cos \omega t \sin \theta$ and the output of foils 56, 58 will be $\cos \omega t \cos \theta$. When positioned as shown in FIGS. 4 and 5 the capacitive coupling between foils 48, 50 and 56, 58 is at a maximum while the capacitive coupling between foils 48, 50 and 52, 54 is a minimum absolute value. Sine foils 52, 54 are radially spaced from but circumferentially coextesive with cosine foils 56, 58.

Since the output impedance of stationary output foils 52, 54 and 56, 58 is rather high, differential amplifiers 60 and 62 can be provided on the output stationary printed circuit board to increase signal strength. Thus a strong output signal can be transmitted to other equipment.

Figure 6:
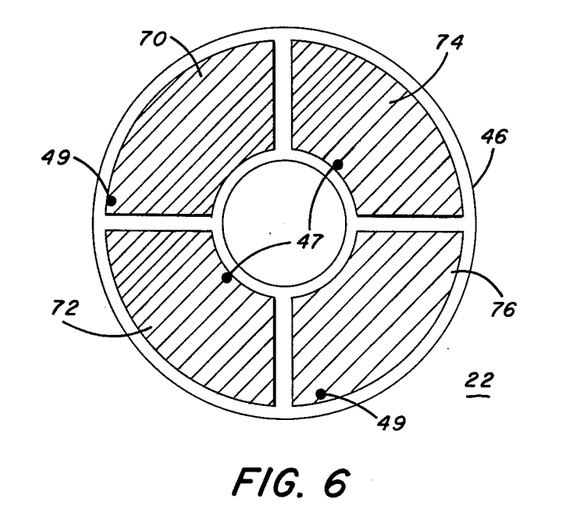
FIG. 6 is a view of a rotary member showing movable output foils of a two cycle resolver.

The resolver illustrated in FIGS. 1 through 5 is a one cycle two-phase unit. Units having two, three or more cycles are formed by proper configuration of the output movable and stationary foils. The relative shape of the output movable foils and the output stationary foils determines how the capacitive coupling varies as their angular alignment changes. The variation of this capacitive coupling determines the shape of the output function defined by the envelope of the carrier signal. Regardless of number of the resolver poles the stationary input foils 28 and 30 configuration and the movable input foils 38 and 40 configuration remains generally the same. That is, these foils or conductors 28, 30, 38, and 40 will normally be formed as concentric surfaces with approximately the same area. For a four-pole resolver, foils on side 46 of rotary member 22 can be formed as shown in FIG. 6. Rather than being divided into two foil areas 48 and 50, as shown in FIG. 4 for a single cycle resolver, for a four-pole resolver the foil areas as shown in FIG. 6 are divided into four segments, 70, 72, 74 and 76. Foil areas 70 and 76 are electrically connected together and are connected to rotary input foil 40 by through pin 49. Foil areas 72 and 74 are electrically connected together and are connected by through pins 47 to rotary input foil 38. The capacitive coupling between these rotatable segments 70, 72, 74 and 76 and the stationary segments shown in FIG. 7 thus vary as a sine and cosine function as member 22 is rotated.

Figure 7:
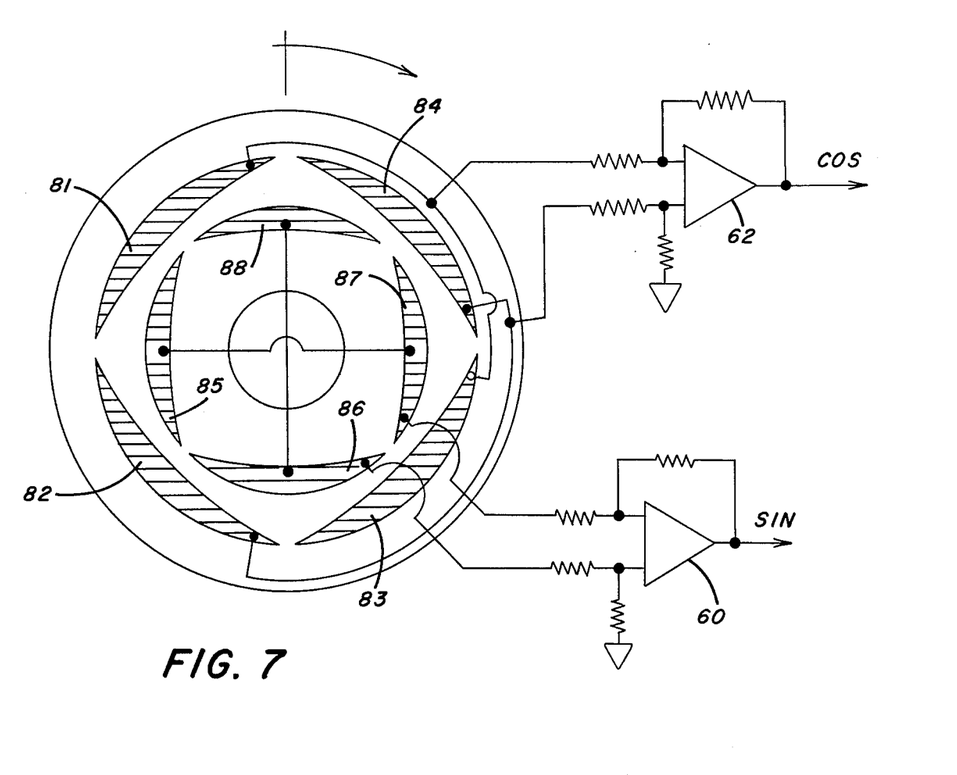
FIG. 7 is a view of a stationary output member showing the shaped output foils which are radially separated but circumferentially coextensive for a two cycle resolver which are capacitively coupled by a sine relationship to the foils of FIG. 6.

The outer output segments 81, 82, 83 and 84 as shown in FIG. 7 provide a cosine output while the inner foil segments 85, 86, 87 and 88 provide a sine output. That is, with foils of FIGS. 6 and 7 in the zero vertical reference position the capacitive coupling between cosine foils 81, 82, 83 and 84 and foils 70, 72, 74 and 76 is at an absolute maximum. As member 22 is rotated through one complete revolution, this coupling intensity goes through two complete cosine cycles. Capacitive coupling between sine foils 85, 86, 87 and 88 and foils 70, 72, 74 and 76 is zero at the zero vertical reference point, indicated in FIGS. 6 and 7 as a vertical line, and goes through two complete sine cycles as rotary member 22 is rotated through one complete revolution. Thus, the output of amplifier 62 is a carrier function whose envelope defines the cosine position and the output of amplifier 60 is a carrier function whose envelope defines the sine position. In FIG. 7 four outer cosine segments 81 through 84 and four inner sine segments 85 through 88 are shown, however, only two of each are required. A small gap is provided between adjacent foils 81 through 84 and 85 through 88. The extra segments are provided for increased foil area to provide an increased area for capacitive coupling and thus greater signal strength. That is, only two outer segments such as 81 and 83 are required to provide the cosine output and only two inner segments such as 86 and 88 are required to provide the proper sine output. Note that the sine output foils 85, 86, 87 and 88 are radially spaced from but circumferentially coextensive with cosine output foils 81, 82, 83 and 84.

By configuring the output stationary foils as shown in FIGS. 5 and 7, very accurate sine and cosine outputs are provided with little harmonic distortion. The disclosed foil shaping eliminates unwanted electrostatic coupling and reduces undesirable hamonics so that an operable one cycle capacitively coupled resolver can easily be constructed. This resolver has significant cost and operating advantages over a comparable standard induction resolver.

Figure 8:
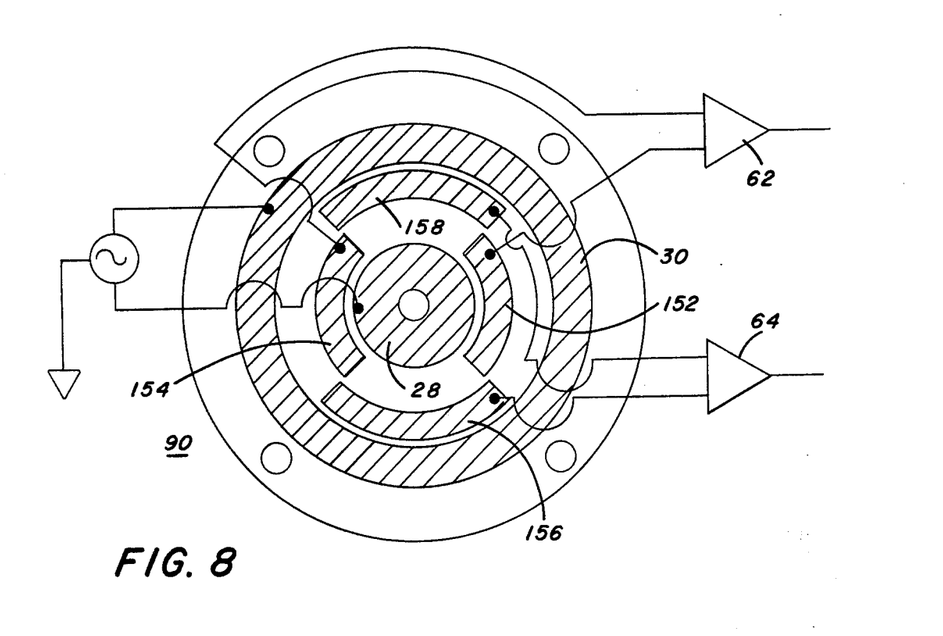
FIG. 8 is a view of the stationary member of a one cycle two piece triangular wave output resolver showing the stationary input foils and the stationary output foils.
Figure 9:
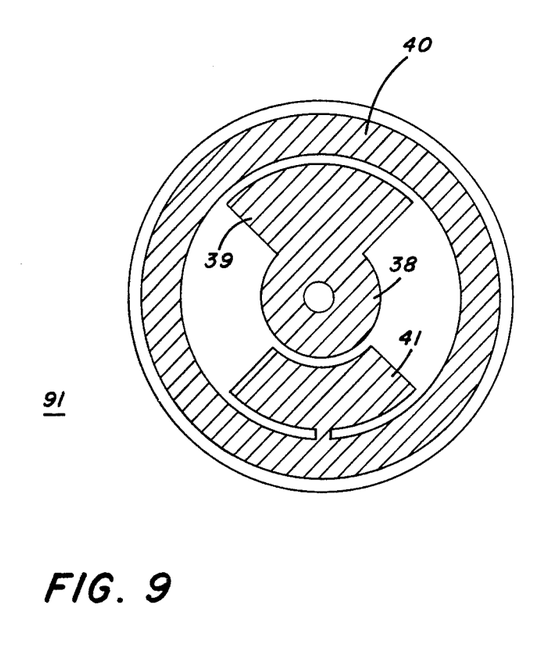
FIG. 9 is a view of the rotor portion of a one cycle two piece resolver formed for providing a triangular output.

Referring now to FIGS. 8 and 9, there is shown the components for a two piece triangular wave output resolver. There is one stationary member required which is formed on a printed circuit board 90. Input foil areas 28 and 30 are formed as shown. The foil areas 28 and 30 define concentric annular surfaces of approximately the same area. Since foil area 28 is formed with a smaller inner and outer diameter than foil area 30, the difference between the inner and outer diameters for foil 28 is greater than for foil 30, so that approximately the same area is defined for both foils. An oscillator carrier signal is applied to these two foils 28 and 30.

The rotary input foil areas are formed on one side of the printed circuit board 91, facing board 90, integral with the rotary output areas. That is, rotary input foil area 38 is formed and sized to be positioned facing foil area 28 and rotary input foil area 40 to be facing foil area 30. Foil areas 28, 38 and 30, 40 are aligned and separated by a small gap so that a constant capacitive coupling is maintained between areas 28 and 38 and between areas 30 and 40 as printed circuit board 91 rotates. Extending from the outer diameter of foil area 38 is a foil 39 inward from the inner diameter of foil area 40 is a foil 41. These extensions 39 and 41 form the rotary output foil areas. The resolver shown in FIGS. 8 and 9 is for a one cycle triangular wave unit. This construction permits the rotary input foils 38 and 40 and the rotary output foils 39 and 41 to be formed on one side of a printed circuit board and thus simplifies construction, however, a larger diameter unit may be necessary. The output carrier signal envelope of the resolver utilizing the items shown in FIGS. 10 and 11 defines a pair of triangular waves. The triangular waves are at quadrature for an unambiguous position indication. This type output is sometimes desirable for various reasons, such as circuit simplicity.

Electrically connected to rotary input foil 38 is rotary output foil 38 and electrically connected to rotary input foil 40 is rotary output foil 41. Stationary output foil areas 152 and 154 are disposed in a quadrature relationship with stationary output foil areas 156 and 158. Stationary output foils 156, 158 are radially spaced from stationary output foils 152, 154. As rotatable member 91 rotates capacitive coupling between foil areas 39 and 41 and pairs 152, 154 and 156, 158 varies. Due to the relative configuration of these foil areas triangular wave outputs are defined by the envelope of the carrier signal from amplifiers 62 and 64. The triangular wave signals are in quadrature to provide the unambiguous position indication.

The disclosed resolver, like most standard resolvers, has an input for receiving a carrier or modulating signal input, a rotary member, which is connected to the shaft being instrumented, and an output for providing a modulated signal indicative of shaft position. The carrier signal is of a relatively high frequency compared to the speed with which the shaft can move. The envelope of the modulated output signal provides the information on shaft position. In the disclosed resolver the input carrier signal is coupled by a constant capacitance to the rotary member. The carrier signal from the rotary member is coupled by a variable capacitance to the output. The variable capacitance is a function of the rotary member angular position and the relative shape of the output foils. Thus, the magnitude of the output signal is determined by the relative position of the rotary member.

Multi-phase units can be provided by having increased number of foils. That is, for a three phase unit, three concentric input foils are required. These are connected to rotary foils having a 120° displacement which are capacitively coupled to selected output foils. Thus, it can be seen that the number of output phases or number of cycles per revolution can be varied.

What is claimed is:

1. A brushless resolver excitable by a carrier signal to provide a trigonometric position indication output of a shaft position defined by the envelope of the output carrier signal comprising:
   a first flat stationary member;
   a first pair of concentric annular foils formed on said stationary member having the carrier signal applied thereto;
   a flat rotatable member separated from said stationary member by a small air gap, supported for rotary movement;
   connecting means for connecting said flat rotatable member to the shaft;
   a second pair of concentric annular foils formed on one side of said rotatable member facing said first pair of foils configured to maintain a constant capacitance with said first pair of foils as said rotatable member rotates;
   a pair of semi-circular annular foils formed on the other side of said rotatable member electrically connected to said second pair of concentric foils;
   a second flat stationary member; and,
   a pair of shaped foils formed on said second flat stationary member, facing a portion of said pair of semi-circular annular foils, configured so the capacitive coupling with said pair of semi-circular annular foils varies as said rotatable member is rotated and the envelope of the output carrier signal taken from said pair of shaped foils defines a sine function which indicates shaft position.

2. A resolver as claimed in claim 1 comprising:
   a second pair of shaped foils formed on said stationary member facing a portion of said pair of semi-circular annular foils configured so the capacitive coupling with said pair of semi-circular annular foils varies as said rotatable member is rotated so that the envelope of the output carrier signal taken from said second pair of shaped foils defines a cosine function to provide an unambiguous indication of shaft position.

3. A resolver as claimed in claim 2 comprising:
   a first amplifier disposed on said stationary member connected to said pair of shaped foils providing an amplified carrier sine output signal; and,
   a second amplifier disposed on said stationary member connected to said second pair of shaped foils providing an amplified carrier cosine output signal.

4. A resolver as claimed in claim 3 wherein:
   said carrier signal is equal to $K \sin \omega t$ and the output signal from said pair of shaped foils is equal to $K1 \sin \omega t \sin \theta$ and the output signal from said second pair of shaped foils is equal to $K2 \sin \omega t \cos \theta$; wherein,
   $K$, $K1$ and $K2$ are constants;
   $\theta$ represents the angular position of the rotatable shaft; and,
   $\sin \omega t$ is an oscillator carrier signal.

5. A brushless resolver comprising:
   a pair of input foils which are stationary for receiving a carrier input signal;
   a first pair of movable foils disposed in proximity to said pair of input foils constructed for constant capacitive coupling with said pair of input foils;
   a second pair of movable foils electrically connected to said first pair of movable foils and being supported for unitary movement with said first pair of movable foils;
   a first pair of output foils disposed in proximity to a portion of said second pair of movable foils being capacitively coupled thereto and constructed so that the capacitive coupling varies in accord with the relative alignment of said second pair of movable foils and said first pair of output foils;
   a second pair of output foils disposed in proximity to a portion of said second pair of movable foils being capacitively coupled thereto and constructed so that the capacitive coupling varies in accord with the relative alignment of said second pair of movable foils and said second pair of output foils; and, said first pair of output foils and said second pair of output foils supported for rotary movement and disposed to be radially spaced apart but circumferentially coextensive and being constructed so when the capacitive coupling between said first pair of output foils and said second pair of movable foils is increasing the capacitive coupling between said second pair of output foils and said second pair of movable foils is decreasing and when the capacitive coupling between said first pair of output foils and said second pair of movable foils is decreasing the capacitive coupling between said second pair of output foils and said second pair of movable foils is increasing.

6. A brushless resolver as claimed in claim 5 comprising:
a stationary printed circuit board having said first pair of output foils printed thereon and said second pair of output foils printed thereon;
a first amplifier disposed on said printed circuit board connected to said first pair of output foils; and,
a second amplifier disposed on said printed circuit board connected to said second pair of output foils.

7. A brushless resolver as claimed in claim 6 wherein:
said first pair of output foils configured so that their capacitive coupling to said second pair of rotatable foils varies as a sine function determined by the angular displacement therebetween; and,
said second pair of output foils configured so that their capacitive coupling to said second pair of rotatable foils varies as a cosine function determined by the angular displacement therebetween.

8. A brushless resolver as claimed in claim 5 wherein:
said first pair of movable foils are concentric and annular; and,
said second pair of movable foils are disposed on the annular surface defined between said first pair of movable foils.

9. A brushless resolver having an input for receiving a carrier signal and an output carrier signal whose envelope defines a trigonometric function indicating a rotatable shaft position comprising:
a primary stator which is nonmovable, formed from an insulating material;
a first pair of flat conducting surfaces of equal area formed on said primary stator each having an electrical input connection thereto across which the input carrier signal is applied;
a movable member formed of an insulating material being flat and having a second pair of flat conducting surfaces formed on one side thereof disposed in close proximity to said first pair of conducting surfaces formed on said primary stator, each being capacitively coupled to one of said conducting surfaces on said stator and each of said pair of surfaces on said movable member being formed so that the capacitive coupling remains constant;
a third pair of conducting surfaces formed on said movable member, electrically connected to said second pair of conducting surfaces formed on the opposite side of said movable member;
a secondary stator formed from an insulating material having a fourth pair of conducting surfaces formed thereon and a fifth pair of conducting surfaces formed thereon, displaced from said fourth pair of conducting surfaces, formed thereon; and,
said fourth pair of conducting surfaces and said fifth pair of conducting surfaces formed on said secondary stator being configured according to a predetermined mathematical function so the capacitive coupling between said third pair of conducting surfaces formed on said movable member and said fourth and fifth pair of conducting surfaces formed on said secondary stator varies as the predetermined mathematical function when said movable member moves.

10. A brushless resolver comprising:
an elongated shaft connectable to a rotary member whose angular position is to be instrumented;
a first pair of concentric foil members, which are stationary and have equal area, concentric around the longitudinal axis of said elongated shaft;
a second pair of concentric foil areas of equal area and the same shape as said first pair of foil areas supported for rotational movement with said elongated shaft and separated from said first pair of foil areas by a small air gap but being capacitively coupled thereto;
a third pair of foils disposed for unitary movement with said second pair of concentric foils and being electrically connected thereto;
a fourth pair of stationary output foils separated from said third pair of foils by a small air gap and being capacitively coupled thereto; and,
said third pair of foils and said fourth pair of foils being of a relatively different shape and one pair being configured in a shape which is determined by a mathematical function so that the capacitive coupling varies as a triangular function as said elongated shaft is rotated.

11. A brushless resolver as claimed in claim 10 wherein:
said third pair of foils are disposed between said second pair of concentric foil areas.

12. A brushless resolver for instrumenting a shaft and providing a modulated position indication comprising:
an input member for receiving a carrier signal;
a flat rotary member mechanically connected to the shaft to be instrumented and separated from the input member by a small air gap;
constant capacitive coupling means comprising a first pair of concentric foils mounted on said input member and a second pair of concentric foils, matching said first pair of foils, mounted on said rotary member for coupling the carrier signal from said input to said rotary member by a constant capacitive coupling;
an output member separated from said rotary member by a small air gap;
output terminals disposed on said output member for providing the modulated output signal indicative of the position of the shaft to be instrumented;
a pair of semi-circular foils supported on said rotary member on the side opposite said second pair of concentric foils for unitary movement therewith; and,
a pair of stationary output foils, supported on said output member, capacitively coupled to said pair of semicircular foils and connected to said output terminals and having a shape determined by a sine function and disposed to provide a sine indication of shaft position.

13. A resolver as claimed in claim 12 comprising:
a second pair of stationary output foils, supported on said output member, capacitively coupled to said pair of semi-circular foils having a shape determined by a sine function and being disposed to provide a cosine indication of shaft position.

* * * * *

UNITED STATES PATENT AND TRADEMARK OFFICE
CERTIFICATE OF CORRECTION

PATENT NO. : 4,092,579
DATED : May 30, 1978
INVENTOR(S) : James G. Weit

It is certified that error appears in the above-identified patent and that said Letters Patent are hereby corrected as shown below:

Column 7, line 19, "38" should read -- 39 --.

Column 7, line 57, "1s" should read --is--.

Signed and Sealed this

Twenty-eighth Day of November 1978

[SEAL]

Attest:

RUTH C. MASON
Attesting Officer

DONALD W. BANNER
Commissioner of Patents and Trademarks